(12) United States Patent
Osborne

(10) Patent No.: US 7,543,432 B1
(45) Date of Patent: Jun. 9, 2009

(54) RETRACTABLE BLADE CUTTING APPARATUSES AND METHODS FOR MOWING MACHINES

(75) Inventor: Christopher M. Osborne, Efland, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/021,444

(22) Filed: Jan. 29, 2008

(51) Int. Cl.
*A01D 34/00* (2006.01)
*A01D 34/73* (2006.01)

(52) U.S. Cl. .................. 56/17.5; 56/255; 56/295; 56/DIG. 17

(58) Field of Classification Search ............ 56/10.4, 56/17.5, 255, 295, DIG. 17, DIG. 20; 30/276
See application file for complete search history.

(56) References Cited

U.S. PATENT DOCUMENTS

| | | | |
|---|---|---|---|
| 2,547,540 A * | 4/1951 | Roberts | 56/255 |
| 2,634,571 A * | 4/1953 | Lawrence et al. | 56/12.7 |
| 3,050,923 A | 8/1962 | Sanderson | |
| 3,184,907 A | 5/1965 | Harloff | |
| 3,320,732 A | 5/1967 | Kirk | |
| 3,399,519 A | 9/1968 | Buchanan | |
| 3,621,642 A | 11/1971 | Leake, Jr. | |
| 3,643,408 A * | 2/1972 | Kulak et al. | 56/17.4 |
| 3,690,051 A * | 9/1972 | Wood | 56/295 |
| 3,715,874 A * | 2/1973 | Goserud | 56/295 |
| 3,975,891 A * | 8/1976 | Gunther | 56/295 |
| 4,058,959 A | 11/1977 | Moss et al. | |
| 4,062,171 A * | 12/1977 | Rose | 56/295 |
| 4,114,354 A * | 9/1978 | Morris | 56/295 |
| 4,158,944 A | 6/1979 | Rabinow | |
| 4,258,536 A | 3/1981 | Kidd et al. | |
| 4,525,990 A * | 7/1985 | Zweegers | 56/295 |
| 5,271,212 A | 12/1993 | Anderson | |
| 5,581,985 A | 12/1996 | Secosky | |
| 5,673,545 A * | 10/1997 | Friesen | 56/255 |
| 6,026,635 A * | 2/2000 | Staiger | 56/295 |

* cited by examiner

*Primary Examiner*—Thomas B Will
*Assistant Examiner*—Joan D Misa
(74) *Attorney, Agent, or Firm*—Jenkins, Wilson, Taylor & Hunt, P.A.

(57) ABSTRACT

Apparatuses and methods are provided for preventing damage to a lawnmower engine and crankshaft when the lawnmower cutting blade encounters an obstructive object. A cutting device for a lawnmower is provided and can include an elongate base member, at least one cutting element pivotably attached to the elongate base member, and a biasing mechanism that engages the cutting element and elongate base member. The at least one cutting element can include a blade portion and a drive engagement portion. The cutting element can pivot when the blade portion strikes an obstructive object such that the blade portion absorbs the impact and retracts to form a blunt shape to prevent damage to the cutting element. The pivoting of the cutting element causes the drive engagement portion to disengage from the crankshaft of the lawnmower to prevent damage thereto.

25 Claims, 4 Drawing Sheets

RETRACTABLE BLADE CUTTING APPARATUSES AND METHODS FOR MOWING MACHINES

TECHNICAL FIELD

The subject matter disclosed herein relates generally to apparatuses and methods for preventing damage to a lawnmower engine and crankshaft when a lawnmower cutting blade encounters an obstructive object. More particularly, the present subject matter relates to providing retractable blade cutting apparatuses and methods where a cutting blade can disengage from the crankshaft when the cutting blade strikes an object.

BACKGROUND

Lawn mowing machines include cutting blades that are attached to a shaft, such as a crankshaft, within the mowing machines that rotate at high speeds for cutting grass. In operation, a mowing machine engine powers the crankshaft to rotate, which in turn rotates the cutting blade that is secured to the crankshaft. Thus, the crankshaft can become damaged when the cutting blade encounters or strikes an obstructive object, for example a rock, because rotation of the blade is interrupted and in some instances the object can completely prevent rotation of the blade and the crankshaft. Meanwhile, the engine continues to attempt to overcome this force, which can lead to damage to the engine and overheating. Furthermore, the crankshaft can become bent after striking an object such as a rock, which requires straightening by a technician that leads to lawn mower downtime.

Previous solutions to such problems have included attaching breakaway or yieldable blade tips to a cutting blade in a fixed manner to the rotating crankshaft. Although these blade tips may yield to an obstructive object, the blade tips continue to repetitively strike the object, thereby causing damage to the blade tips that can make the blade tips dull. Also, the cutting blade is still fixed to the rotating shaft in an unyielding manner, thereby continuing to strain the engine as it continues to attempt to overcome the resistive force applied by the object.

Therefore, it would advantageous to employ a cutting device that includes a cutting blade coupled with a base member such that the cutting blade can retract within the base member to form a blunt object when striking an object to prevent damage to the blade tip. The cutting blade can also pivotably disengage from the crankshaft when the cutting blade retracts to thereby prevent strain on the crankshaft to avoid overheating and damage to the mower engine.

SUMMARY

According to one aspect, a cutting device for a mowing machine can comprise an elongate base member. The cutting device can further comprise at least one cutting element pivotably attached to the elongate base member and can have a blade portion and a drive engagement portion. A biasing mechanism engages the blade portion and the elongate blade housing.

According to another aspect, a mowing machine can comprise a prime mover and a cutting device having at least one cutting element and an elongate base member. The elongate base member can include a first end, a second end, and an intermediate portion wherein the intermediate portion can define an aperture for receiving a shaft and further wherein the first end and second end both can have upper and lower lips that define a recess. The at least one cutting element can have a blade portion and a drive engagement portion and wherein the at least one cutting element is pivotably attached to the intermediate portion of the elongate base member and the blade portion is disposed within the recesses of elongate base member at the first end and the second end and further wherein the drive engagement portion is configured to rotatably engage the shaft. A biasing mechanism engages the blade portion and the elongate blade housing within the recesses such that the blade portion retracts into the recess when the blade portion strikes an obtrusive object, which thereby causes the cutting element to pivot with respect to the elongate base member, resulting in disengagement of the drive engagement portion from the shaft to prevent damage to the shaft while in rotation.

Methods are also provided for preventing damage to a mowing machine shaft during rotation of the shaft when a blade rotatably coupled to the shaft encounters an obstructive object. The methods generally comprise providing a mower housing having a prime mover attached to the mower housing for propelling the mowing machine and providing a cutting device rotatably attached to a shaft of the mowing machine. A handle can be attached to the mower housing. The cutting device provided can include an elongate base member and at least one cutting element pivotably attached to the elongate base member and having a blade portion and a drive engagement portion. A biasing mechanism engages the blade portion and the elongate base member. The methods further can comprise operating the mowing machine to cut grass wherein the at least one cutting element pivots when the blade portion strikes a large object, thereby causing the drive engagement portion of the cuffing element to disengage the shaft and preventing damage to the blade portion and mowing machine.

It is therefore an object of the present disclosure to provide retractable blade cutting device apparatuses and methods for preventing damage to a cutting blade and driving mechanism of a mowing machine, such as a crankshaft, when the cutting blade encounters an obstructive object.

An object having been stated hereinabove, and which is achieved in whole or in part by the subject matter disclosed herein, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures in which.

DETAILED DESCRIPTION

Reference will now be made in detail to presently preferred embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
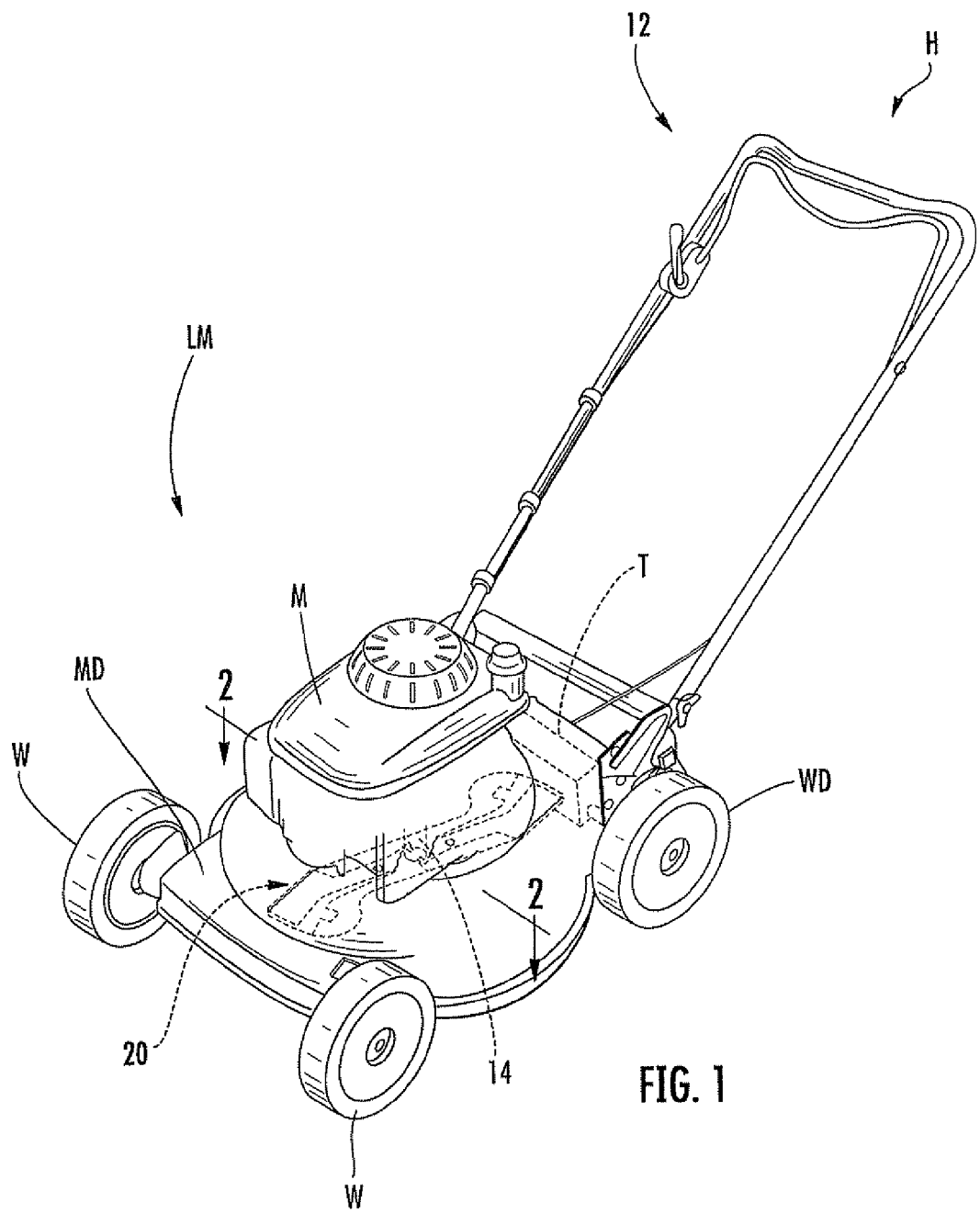
FIG. 1 illustrates a perspective view of a mowing machine including an aspect of a cutting device provided in accordance with the subject matter disclosed herein.

Referring now to FIG. 1, a self-propelled lawn mowing machine generally designated LM having a cutting device disclosed generally designated as 20 is illustrated in phantom by way of example. Lawnmower LM can comprise any suitable configuration generally known to persons skilled in the art or later developed. In one aspect, lawnmower LM can comprise a housing such as a mower deck MD, which can include a front portion, a rear portion, an upper exterior portion, and a lower, interior portion. A handle generally designated H can be coupled to the rear portion of mower deck MD by any suitable structure, and can extend upwardly therefrom at an angle appropriate for comfortable grasping and manipulation by an operator. Handle H provides an area to be gripped by an operator and includes a proximal end section, generally designated 12, which can be the section farthest away from the main operational components of lawn mower LM, such as prime mover or motor M and transmission T. In one aspect, proximal end section 12 of handle H can be generally U-shaped.

Mower deck MD can be supported for rolling movement over a surface by a set of wheels and can include one or more idle (non-driving) wheels, such as wheels W, and one or more driving wheels, such as driving wheels WD. There is no limitation as to which one or more of wheels W functions as driving wheel or wheels WD, although typically the rearmost wheel or wheels serve this function.

Figure 7:
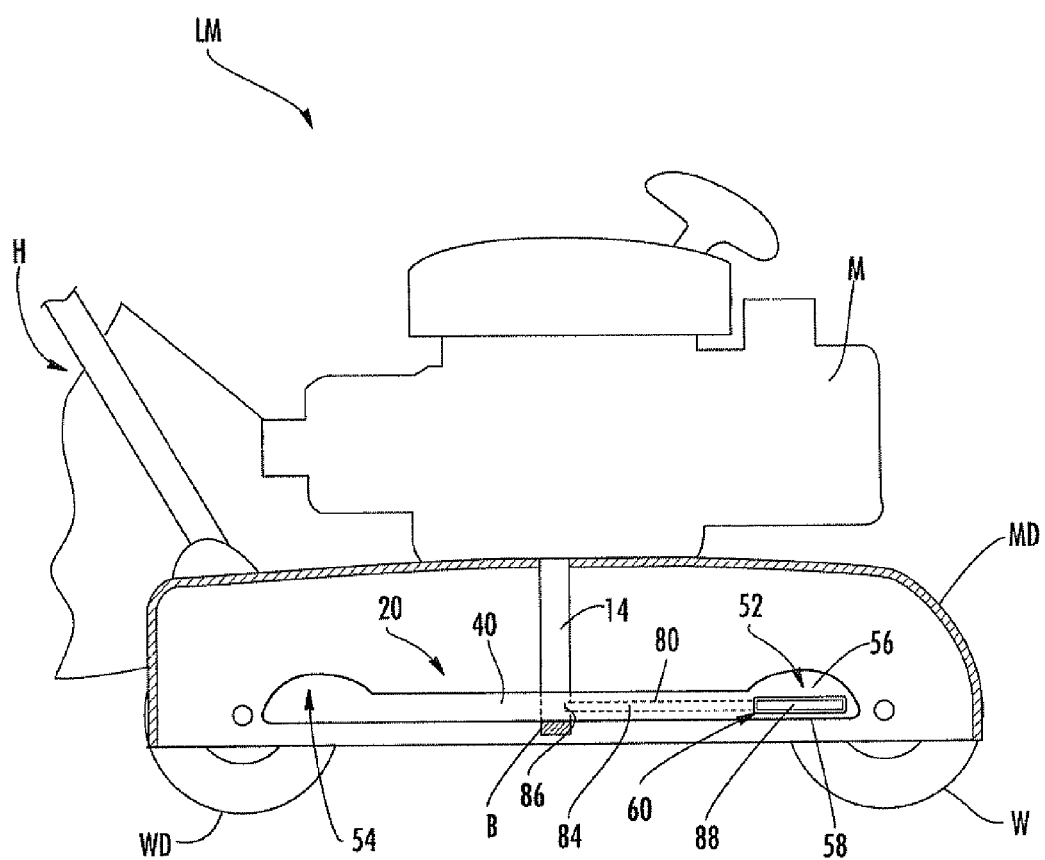
FIG. 7 illustrates a cross-sectional side view of the lower section of a mowing machine with a cutting device attached thereto according to the present subject matter.

Lawnmower LM can also include a powered drive system or assembly. The powered drive system can include any suitable prime mover such as motor M, which can be an electric motor or an internal combustion engine. The drive system can further include a transmission T illustrated in phantom in FIG. 1. Both motor M and transmission T can be mounted to the upper exterior portion of mower deck MD in a suitable manner. As shown in FIGS. 1 and 7, a driven member such as a crankshaft 14 or any other suitable output shaft of motor M can rotate cutting device 20 and can be disposed within the interior portion of mower deck MD. Cutting device 20 can be axially restrained on crankshaft 14 by a flanged bolt B (shown in FIG. 7) secured to crankshaft 14. For example, an end of crankshaft 14 can have a threaded bore therein in which a threaded stem of flanged bolt B can be screwed.

Motor M also can transfer power to driving wheels WD through transmission T in any suitable manner, thereby rendering lawnmower LM self-propelled in response to control by an operator. Torque from crankshaft 14 can, for example, be transferred to an input shaft (not shown) of transmission T via an endless belt (not shown). Torque from the input shaft can be transferred to an additional output shaft (e.g., an axle or half-shaft coupled to respective driving wheels WD) through an appropriate reducing or transfer means such as a gear set (not shown). Transmission T can be a variable-speed transmission.

The different types, structures, and functions of components of lawnmower LM in addition to those described above are known to persons skilled in the art, and therefore are not further described.

Referring now to FIGS. 1-4, cutting device 20 having a construction in accordance with the present disclosure is illustrated by way of example. In one aspect, cutting device 20 can include an elongate base member 40 and a plurality of cutting elements or blades 80. In another aspect, cutting device 20 can include elongate base member 40 and a plurality of cutting blades 80 that can be constructed to perform in accordance with the present disclosure. Elongate base member 40 can be constructed of a rigid plastic material. Cutting blades 80 can be constructed of a metal material, ceramic material, or any other suitable material.

Figure 2:
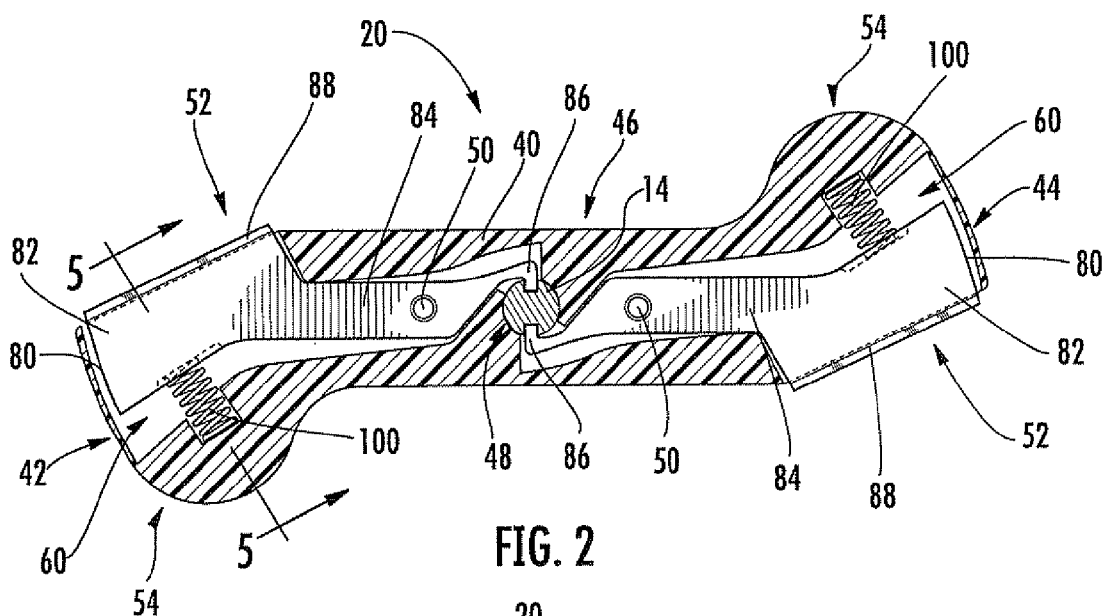
FIG. 2 illustrates a cross-sectional plan view of an embodiment of a cutting device in a fully engaged position according to the present subject matter.
Figure 3:
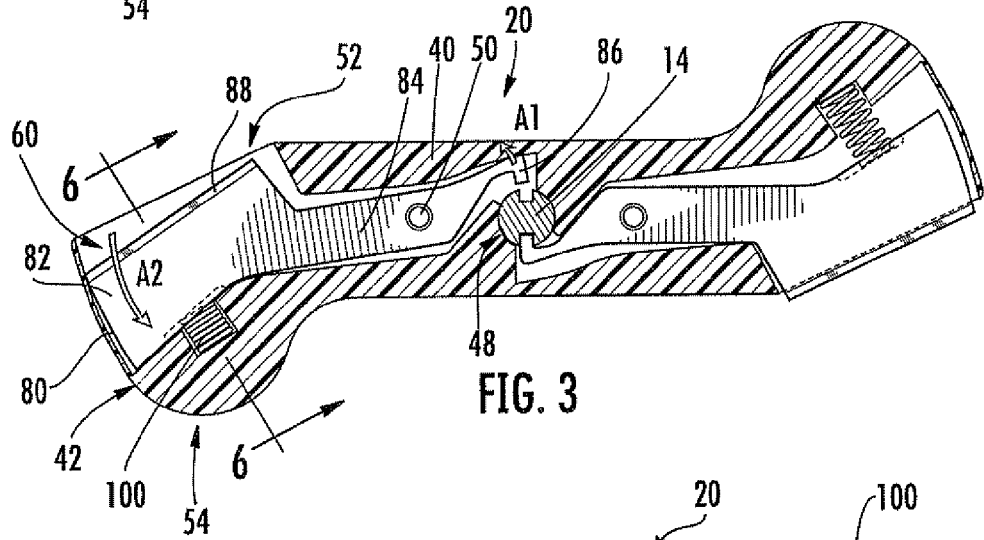
FIG. 3 illustrates a cross-sectional plan view of an embodiment of a cutting device in a partially engaged position according to the present subject matter.
Figure 4:
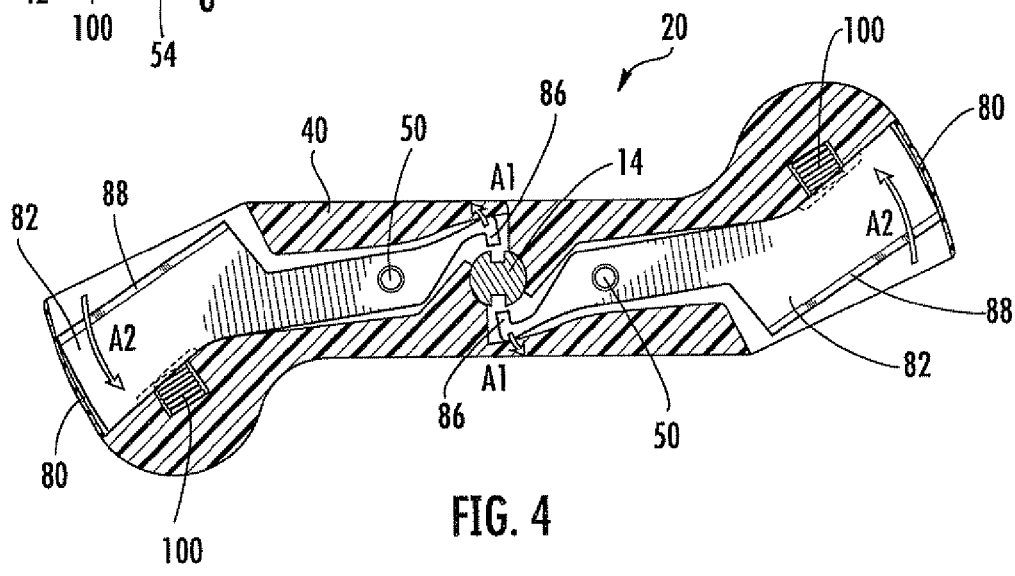
FIG. 4 illustrates a cross-sectional plan view of an embodiment of a cutting device in a fully disengaged position according to the present subject matter.

As shown in FIGS. 2-4, elongate base member 40 can have a first end generally designated 42, a second end generally designated 44, and an intermediate portion generally designated 46. Elongate base member 40 can also include an aperture generally designated 48 for receiving a crankshaft 14. Aperture 48 can be defined by intermediate portion 46 and can be substantially centered between first end 42 and second end 44. Intermediate portion 46 can be substantially elongate and can be integral with first and second ends 42, 44. Intermediate portion 46 can also include a plurality of pivoting mechanisms 50 for facilitating a pivoting motion by cutting blades 80 when pivotably attached to elongate base member 40. Pivoting mechanisms 50 can include screws, bolts, pins, rivets or any other suitable mechanism for facilitating a pivoting action.

Figure 5:
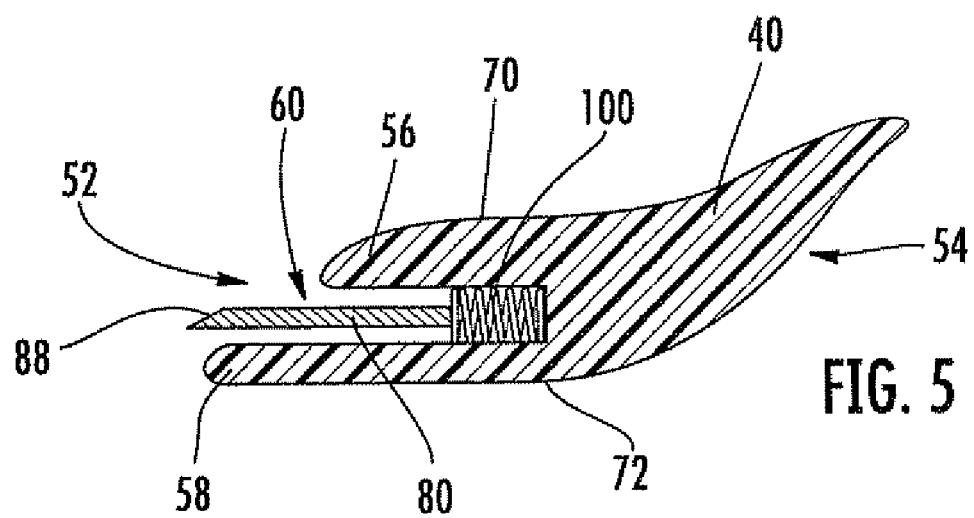
FIG. 5 illustrates a cross-sectional view of the embodiment of the cutting device in a fully engaged position according to FIG. 2.
Figure 6:
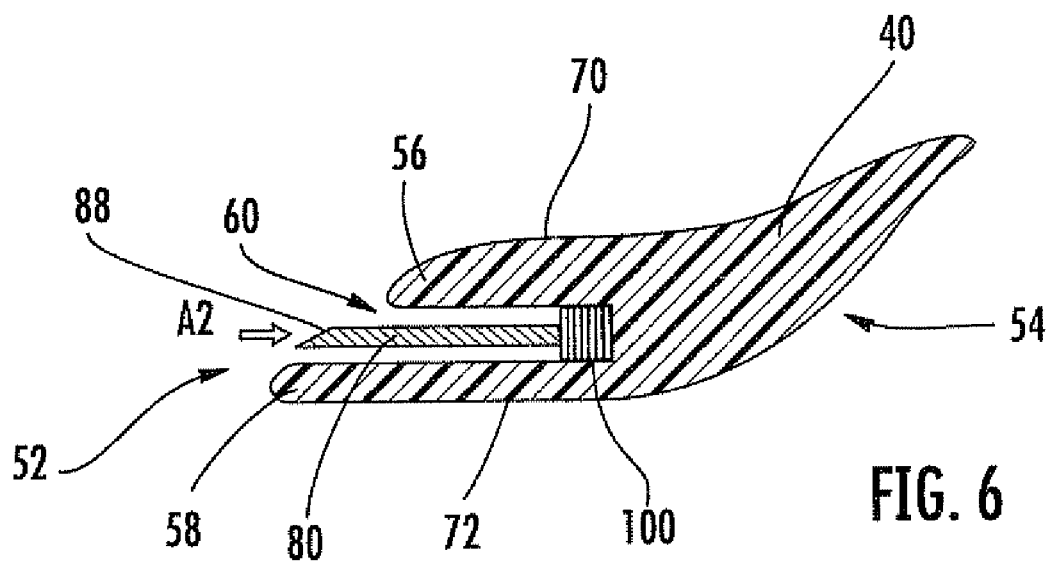
FIG. 6 illustrates a cross-sectional view of the embodiment of the cutting device in a partially engaged position according to FIG. 2.

In one aspect, first and second ends 42, 44 can be positioned on opposite ends of intermediate portion 46 and can be substantially identical. In one aspect, first and second ends 42, 44 can be club-shaped, that is that first and second ends 42, 44 are shaped similarly to the head of a golf club driver. First and second ends 42, 44 can have a front blade section generally designated 52 and a rear section generally designated 54. Rear section 54 can be shaped for providing balance to cutting device 20 so that as cutting device 20 rotates at a high speed it remains balanced due to centrifugal force. Rear section 54 can also be fin-shaped as shown in FIGS. 5 and 6 to improve lift for standing the grass blades to an erect position so that cutting blades 80 are perpendicular to the grass blades at the moment the grass blades are cut. By improving lift, cutting blades 80 can be slowed, which in turn can reduce noise emission levels. First and second ends 42, 44 can be any suitable shape for housing cutting blades 80 or for mounting thereto.

As illustrated in FIGS. 5-6, front blade section 52 can have an upper lip 56 and a lower lip 58 that can extend beyond upper lip 56. In other aspects, upper lip 56 and lower lip 58 can extend the same distance or upper lip 58 can extend beyond lower lip 58 such that a blunt surface is created when cutting blades 80 pivot into a retracted position. Any suitable design or shape for first and second ends 42, 44 that can create a blunt shaped face can be utilized. Upper lip 56 and lower lip 58 can define an elongated recess generally designated 60 for at least partially housing cutting blades 80. Elongate recess 60 can extend into intermediate portion 46 such that cutting blades 80 can pivot within elongate base member 40.

As shown in FIGS. 2-4 and 7, cutting blades 80 can be encapsulated within elongate base member 40. The hatched portion represents the solid portion of elongate base member 40 and the non-hatched portion represents elongate recess 60, which can extend from first and second ends 42, 44 through intermediate portion 46 to aperture 48, whereby drive engagement portion 86 can extend into aperture 48 to matingly engage crankshaft 14. In this aspect, cutting blades 80 can be substantially encapsulated within elongate base member 40 except for a small portion of cutting blades 80, as discussed below. These top-down cross-sectional views eliminate the portions of elongate base member 40 that extend over cutting blades 80 according to this aspect. According to this aspect, cutting blade 80 is sandwiched between a top side 70 and a bottom side 72 of elongate base member 40, as illustrated in FIGS. 5-7.

In another aspect, cutting blades 80 can be positioned on top of or underneath elongate base member 40 provided that cutting blades 80 can retract to a position such that no portion of cutting blades 80 extends beyond elongate base member 40. For example, if the illustrations in FIGS. 2-4 were not cross-sectional views, then cutting blades 80 would be positioned on top of elongate base member 40 such that in a plan view of this particular embodiment cutting blades 80 would be entirely visible, as opposed to simply the cutting portion of cutting blades 80 as shown in FIGS. 2-4 and 7.

Cutting blades 80 can be pivotably attached to elongate base member 40 with pivoting mechanisms 50. Cutting blades 80 can have a blade portion 82, a middle portion 84, and a drive engagement portion 86. Cutting blades 80 can be substantially shaped like a butcher's knife, or any other suitable shape, with blade portion 82 being wide and middle portion 84 being elongate. Drive engagement portion 86 can be shaped like a hook or any other suitable design for matingly engaging crankshaft 14. Crankshaft 14 can include notches or any other suitable configuration for receiving drive engagement portion 86. Cutting blades 80 can be pivotably attached to elongate base member 40 at points on middle portion 84 that are proximate aperture 48. Blade portion 82 can have a beveled end 88 that is sharpened for efficiently and effectively cutting blades of grass.

In one aspect, cutting blades 80 can be used wherein drive engagement portions 86 are linked in some suitable manner such that disengagement of multiple blades can occur simultaneously. In another aspect, a single blade can be used such that cutting device 20 is no longer rotatably coupled to crankshaft 14. In other aspects of the present disclosure, multiple blades can be used with each having drive engagement portions 86 to be matingly coupled to crankshaft 14 such that each blade can separately disengage therefrom.

For each of the cutting blades 80, a biasing mechanism 100 can extend between and contact blade portion 82 of cutting blade 80 and elongate base member 40 within elongate recess 60 of first and second ends 42, 44. Biasing mechanism 100 can be used to bias blade portion 82 of cutting blade 80 to extend beyond upper lip 56 and lower lip 58 such that blade portion 82 is positioned to effectively cut blades of grass in a cutting position. In one aspect, biasing mechanism 100 can be implanted within elongate base member 40 to extend through elongate recess 60 to attach to cutting blade 80. Biasing mechanism 100 can be a spring or any other suitable structure for biasing cutting blade 80 to extend beyond upper lip 56 and lower lip 58. Biasing mechanism 100 can be compressible such that cutting blade 80 can retract within elongate recess 60 when cutting blade 80 strikes a resistive object such that cutting blade 80 is in a non-cutting position. The tension strength of biasing mechanism 100 can be adjusted such that the strength is commensurate with the expected forces that are associated with the aforementioned problems.

Cutting blades 80 can be interchangeable and replaceable. Thus, biasing mechanism 100 can be fixed to cutting blade 80 in a manner that permits detachment from one another, wherein a new cutting blade 80 could be attached to biasing mechanism 100. Alternatively, biasing mechanism 100 can be permanently affixed to cutting blade 80 and removably detachable from elongate base member 40. In another aspect, biasing mechanisms 100 can be permanently fixed to cutting blades 80 and elongate base member 40. It is envisioned that cutting device 20 can be completely replaced with a replacement cutting device 20 when cutting blades 80 become worn or damaged. In one aspect, flanged bolt B can be removed to permit cutting device 20 to be removed from engagement with crankshaft 14. A replacement cutting device 20 can then be positioned on crankshaft 14 and secured with flanged bolt B to provide a new cutting device 20 having newly sharpened cutting blades 80. Alternatively, elongate base member 40 can be constructed of multiple parts such that elongate base member 40 can be disassembled and cutting blades 80 can be removed and then replaced with new replacement cutting blades 80, after which elongate base member 40 can be reassembled.

As illustrated in FIG. 7, cutting device 20 can be rotatably coupled to crankshaft 14 of lawnmower LM. In this aspect, one of the two cutting blades 80 is illustrated and is shown partially in phantom such that cutting blade 80 is encapsulated within elongate base member 40 and beveled edge 88 of cutting blade 80 extends from elongate recess 60 for cutting blades of grass. Bolt B can axially restrain cutting device 20 on crankshaft 14. Crankshaft 14 matingly receives drive engagement portion 86 of cutting blade 80. Front blade section generally designated 52 and rear section generally designated 54 can be seen in this embodiment and face opposite directions such that both ends can cut blades of grass during rotation of cutting device 20.

In operation, cutting device 20 can matingly engage crankshaft 14 by having crankshaft 14 receive drive engagement portion 86 of cutting blades 80, as shown in FIG. 2, such that cutting device 20 can rotate about crankshaft 14 in a grass cutting mode when motor M and transmission T transfer torque to crankshaft 14. When cutting device 20 is in a grass cutting mode, cutting blades 80 can be biased by biasing mechanism 100 such that beveled end 88 of blade portion 82 of cutting blades 80 extends beyond upper lip 56 and lower lip 58 of first and second ends 42, 44 of elongate base member 40, as illustrated in FIG. 5. Cutting blades 80 can therefore rotate at a high speed to cut blades of grass in a cutting position.

When blade portion 82 of each cutting blade 80 strikes an obstructive object (e.g., a rock), each cutting blade 80 can absorb the impact and retract within elongate recess 60 in a direction A2 such that biasing mechanism 100 is in a compressed state and beveled end 88 can be retracted to a position wherein beveled end 88 does not extend beyond upper lip 56 and lower lip 58, as shown in FIGS. 3, 4 and 6, thereby creating a blunt shape to strike the object wherein cutting blade 80 moves from a cutting position to a non-cutting position. The action of blade portion 82 retracting into elongate recess 60 can cause the corresponding cutting blade 80 to pivot at pivoting mechanism 50 positioned on intermediate portion 46 of elongate base member 40. Simultaneously, the drive engagement portion 86 of the cutting blade 80 is pivoted away from crankshaft 14 in direction A1, as shown in FIG. 3, thereby disengaging the cutting blade 80 and cutting device 20 from crankshaft 14. The other cutting blade 80 that is not encountering the obstructive object can remain engaged to crankshaft 14 until it encounters the same obstructive object during the same rotation of cutting device 20, and upon encountering the object can pivot and retract in the same manner.

After mower deck MD passes the obstructive object or blade portion 82 rotates past the object, biasing mechanism 100 can force blade portion 82 and beveled end 88 out of elongate recess 60 such that beveled end 88 once again extends beyond upper lip 56 and lower lip 58, resulting in lawnmower LM operating in a cutting mode wherein cutting blade 80 is in a cutting position. Simultaneously, cutting blade 80 can pivot at pivoting mechanism 50 to permit drive engagement portion 86 of cutting blade 80 to re-engage crankshaft 14, for example the hooks of drive engagement portion 86 being received within the notched section of crankshaft 14, thereby facilitating rotation of cutting device 20 about crankshaft 14 within mower deck MD.

As illustrated in FIG. 4, it is also possible for drive engagement portions 86 can be disengaged from crankshaft 14 simultaneously such that cutting device 20 is no longer rotatably coupled to crankshaft 14, causing cutting device 20 to free spin and slow until rotation of cutting device 20 is terminated.

It will be understood that various details of the disclosed subject matter may be changed without departing from the scope of the disclosed subject matter. Furthermore, the foregoing description is for the purpose of illustration only, and not for the purpose of limitation.

What is claimed is:

1. A cutting device for a mowing machine comprising:
   an elongate base member;
   a driven member for rotationally moving the elongate base member;
   at least one cutting element attached to the elongate base member for rotation with the elongate base member, the cutting element being movable from a cutting position to a non-cutting position and the cutting element having a blade portion and a drive engagement portion; and
   wherein the drive engagement portion is configured for engaging with the driven member to couple rotational movement of the driven member with the elongate base member when the cutting element is in the cutting position, and the drive engagement portion is configured for disengaging from the driven member to decouple rotational movement of the driven member from the elongate base member by movement of the cutting element from the cutting position to the non-cutting position.

2. The cutting device of claim 1 further comprising a biasing mechanism engaging the blade portion and the elongate base member.

3. The cutting device of claim 2 wherein the blade portion of the at least one cutting element is automatically retractable to the non-cutting position by encountering an obstructive object.

4. The cutting device of claim 1 wherein the blade portion comprises a beveled portion for cutting blades of grass and the at least one cutting element is encapsulated at least partially within the elongate base member.

5. The cutting device of claim 1 wherein the elongate base member is constructed from a plastic material.

6. The cutting device of claim 1 wherein the at least one cutting element comprises at least one of a metal material or a ceramic material.

7. The cutting device of claim 1 wherein the at least one cutting element is replaceable such that the at least one cutting element can be removed from the cutting device and replaced.

8. The cutting device of claim 1 wherein the elongate base member comprises a first end and a second end that are fin-shaped to improve lift such that grass to be cut stands erect.

9. The cutting device of claim 1 wherein the elongate base member comprises a first end and a second end that is substantially club-shaped.

10. The cutting device of claim 9 wherein the first and second ends both comprise an upper lip and a lower lip that define a recess for housing the blade portion of the cutting element.

11. The cutting device of claim 10 further comprising a biasing mechanism comprising a spring that engages the elongate base member and blade portion within the recess.

12. A self-propelled mowing machine comprising:
    a mower housing having a prime mover attached to the mower housing for propelling the mowing machine;
    a handle attached to the mower housing;
    a driven member rotatably attached to the mower housing; and
    a cutting device rotatable by the driven member, the cutting device comprising:
       an elongate base member rotatable by the driven member;
       at least one cutting element attached to the elongate base member for rotation with the elongate base member, the cutting element being movable from a cutting position to a non-cutting position and the cuffing element having a blade portion and a drive engagement portion; and
    wherein the drive engagement portion is configured for engaging with the driven member to couple rotational movement of the driven member with the elongate base member and the drive engagement portion is configured for disengaging from the driven member to decouple rotational movement of the driven member from the elongate base member upon movement of the cutting element from the cutting position to the non-cutting position.

13. The mowing machine of claim 12 wherein the cutting device further comprises a biasing mechanism engaging the blade portion and the elongate base member.

14. The mowing machine of claim 13 wherein the blade portion of the at least one cutting element is automatically retractable to the non-cutting position by encountering an obstructive object.

15. The mowing machine of claim 12 wherein the elongate base member is constructed from a plastic material.

16. The mowing machine of claim 12 wherein the at least one cutting element is replaceable such that the at least one cutting element can be removed from the cutting device and replaced.

17. The mowing machine of claim 12 wherein the elongate base member comprises a first end and a second end that is substantially club-shaped.

18. The mowing machine of claim 17 wherein the first and second ends both comprise an upper lip and a lower lip that define a recess for housing the blade portion of the cutting element and the cutting device further comprises a biasing mechanism comprising a spring that engages the elongate base member and blade portion within the recess.

19. A self-propelled mowing machine comprising:
    a mower housing having front, rear, upper and lower portions;
    a handle attached to the rear upper portion of the mower housing;

an engine attached to the upper portion of the mower housing;

a driven member operably engaging the engine such that the driven member is rotatable;

a variable speed transmission for propelling the self-propelled mowing machine; and a cutting device rotatably coupled to the driven member and being retractable such that when the cutting device engages an obstructive object the cutting device disengages from the rotating driven member, and wherein the cutting device comprises:

an elongate base member having a first end, a second end, and an intermediate portion wherein the intermediate portion defines an aperture for receiving the driven member and further wherein the first end and second end both have upper and lower lips that define a recess;

at least one cutting element having a blade portion and a drive engagement portion and wherein the at least one cutting element is pivotably attached to the intermediate portion of the elongate base member and the blade portion is disposed within the recesses of elongate base member at the first end and the second end and further wherein the drive engagement portion is configured to engage the driven member; and a biasing mechanism engaging the blade portion and the elongate base member within the recesses such that the blade portion retracts into the recess when the blade portion strikes an obstructive object, thereby causing the cutting element to pivot with respect to the elongate base member, resulting in disengagement of the drive engagement portion from the driven member to prevent damage to the driven member while in rotation.

20. The self-propelled mowing machine of claim 19 wherein the cutting element is constructed from a metal material and the elongate base member is constructed from a plastic material.

21. The self-propelled mowing machine of claim 19 wherein the first and second ends of the elongate base member are substantially club-shaped.

22. A method of preventing damage to a mowing machine driven member, the method comprising:

rotating a driven member of a mowing machine;

engaging a retractable blade cutting device to the driven member such that the retractable blade cutting device is rotatable by the driven member, and wherein the retractable blade cutting device comprises an elongate base member and at least one cutting element attached to the elongate base member for rotation with the elongate base member, the cutting element being movable from a cutting position to a non-cutting position and the cutting element having a blade portion and a drive engagement portion; and pivoting the at least one cutting element from a cutting position to a non-cutting position when the blade portion strikes an obstructive object, thereby causing the drive engagement portion of the cutting element to disengage from the driven member.

23. The method according to claim 22 further comprising biasing the cutting element away from the elongate base member such that the blade portion extends beyond the elongate base member.

24. The method according to claim 22 wherein the elongate base member has a first end and a second end that are fin-shaped to improve lift such that grass to be cut is in an erect position.

25. A cutting device for a mowing machine comprising:

an elongate base member;

a driven member for rotationally moving the elongate base member;

at least one cutting element attached to the elongate base member for rotation with the elongate base member, the cutting element being pivotable relative to the elongate base member from a cutting position to a non-cutting position and the cutting element having a blade portion and a drive engagement portion; and the cutting element being movable wherein the drive engagement portion is engaged and rotationally movable with the driven member for movement of the elongate base member when the cutting element is in the cutting position, and the cutting element being movable wherein the drive engagement portion is pivotally disengaged from the driven member when the cutting element is pivoted to the non-cutting position.

* * * * *